(No Model.) 2 Sheets—Sheet 1.
J. O'NEIL.
COMBINED AGRICULTURAL WAGON.
No. 269,222. Patented Dec. 19, 1882.
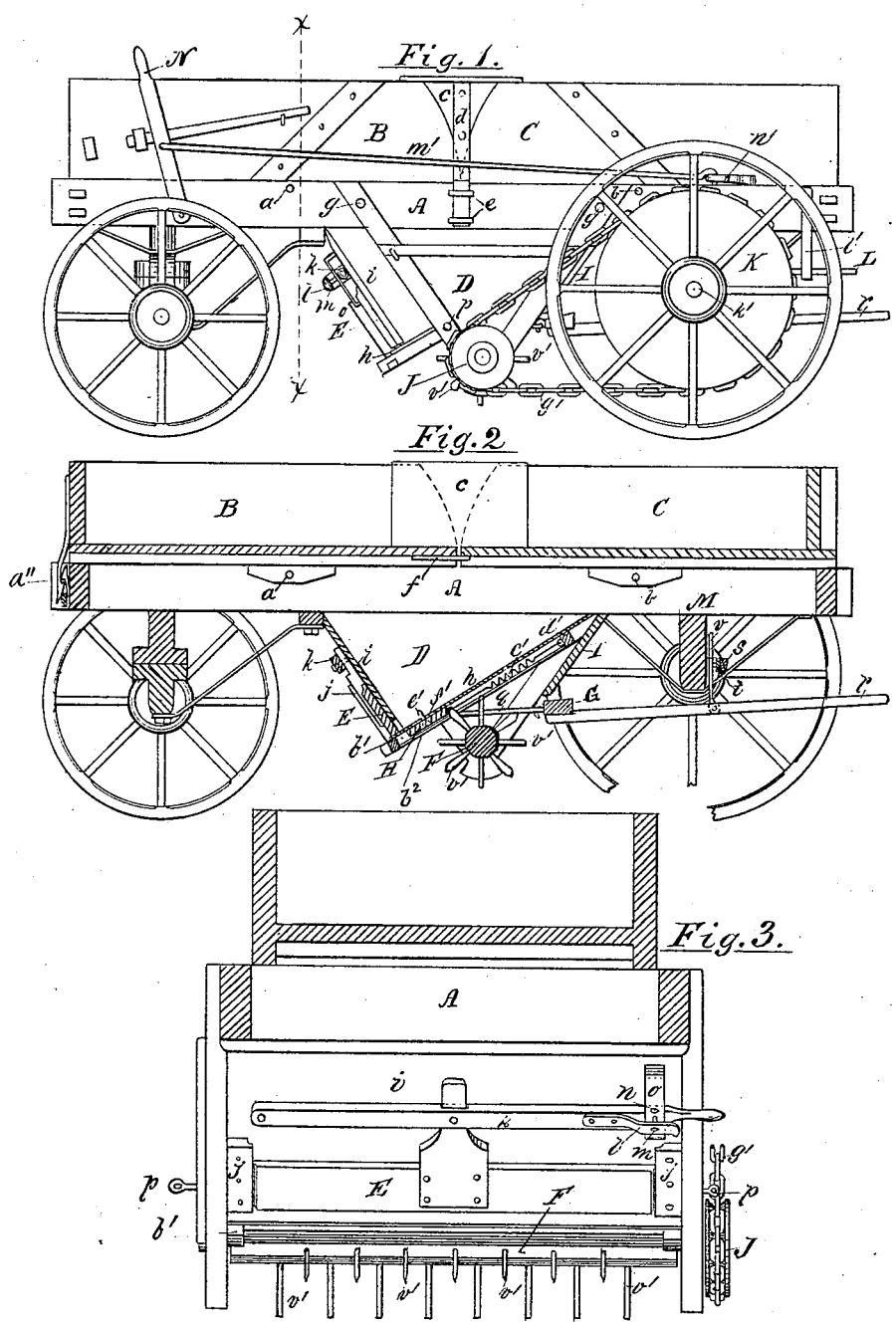
Witnesses
L. J. Coursolles
L. E. Noël
John O'Neil,
Inventor.
By J. Coursolle
Atty

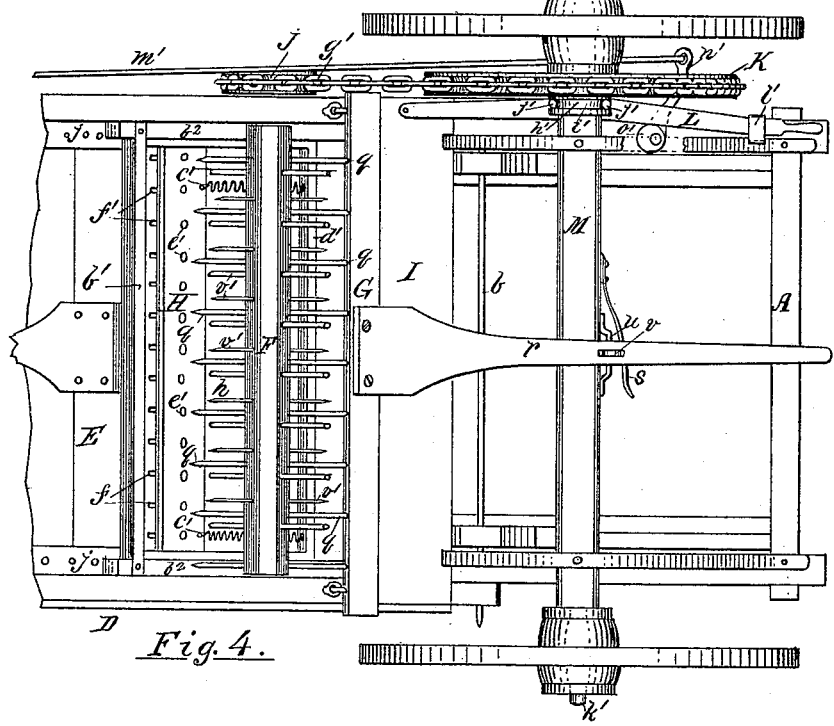
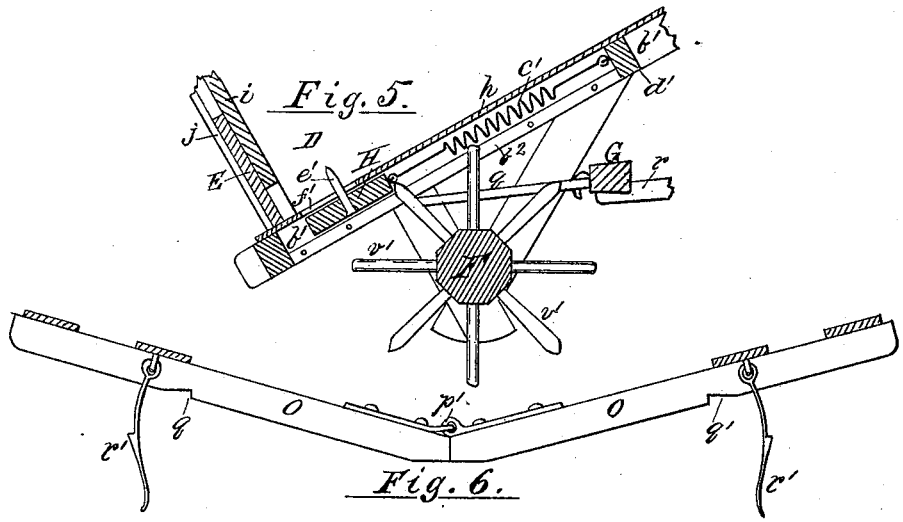

UNITED STATES PATENT OFFICE.

JOHN O'NEIL, OF PAKENHAM, ONTARIO, CANADA.

COMBINED AGRICULTURAL WAGON.

SPECIFICATION forming part of Letters Patent No. 269,222, dated December 19, 1882.

Application filed April 25, 1881. (No model.) Patented in Canada March 8, 1881, No. 12,466.

*To all whom it may concern:*

Be it known that I, JOHN O'NEIL, of Pakenham, in the county of Lanark, in the Province of Ontario, Canada, carriage-manufacturer, have invented certain new and useful Improvements in Combined Agricultural Wagons; and I do hereby declare the following to be a full, clear, and exact description of the same.

My invention relates to the class of vehicles which are constructed with the view to their being easily changed from one shape to another, so as to answer more fully to the different uses in which they may be employed.

The first part of my invention relates to devices for convenience in unloading or emptying the wagon.

The second part of my invention relates to mechanical appliances for breaking up or pulverizing and distributing manures and fertilizers.

In the annexed drawings, which form a part of this specification, Figure 1 is a side elevation of my improved wagon. Fig. 2 is a longitudinal section of the same. Fig. 3 is a cross-section on line $x\ x$. Fig. 4 is a part view of the under side. Fig. 5 is a cross-section through the hopper and the distributing-roller. Fig. 6 is a cross-section of the hay-rack.

The part marked A represents the body-frame of the wagon. It is bolted in any approved manner to the axles or bolsters of the wagon. The box of the wagon is composed of two separate and distinct parts, of which the forward part, B, is pivoted or hinged to the body-frame by the horizontal pivot-rod $a$, and the rear part, C, is pivoted to the body-frame A by the horizontal pivot-rod $b$. This arrangement allows either end of the box to be tilted over toward the other end, so as to deposit its load under the center of the wagon. The inner top corners of the sides of the box are rounded off, as shown, so that neither of them will strike against the opposite ends when being lowered. In the spaces thus left between the opposite ends are placed two removable closing plates or gusset-pieces, $c\ c$, which are secured to standards $d\ d$. These standards are supported in the sockets marked $e$, which are fixed to the body-frame A. When this box is not required for the work being done, it can be removed from the wagon by simply withdrawing the pivot-rods $a$ and $b$ and lifting it off from the body-frame. A floor or bottom may then be laid inside the body-frame on the bolsters. A latch or locking device, $a''$, on the forward end of the body-frame serves to hold the forward part of the wagon-box in a horizontal position. The rear part, B, of the box is held by its forward ends resting on a top piece or cleat, $f$, secured to the rear end of the forward part A.

I will now proceed to describe the manure pulverizing and distributing mechanism, which forms part of my invention.

D is a large hopper, supported against the under side of the body-frame, A, in such a position that when the parts of the wagon-box are tilted up they will empty their load into it. The V-shaped frames, which mainly form the ends of the hopper, are secured to the body-frame A by the bolts $g$, so that the hopper may be removed from the wagon by simply withdrawing these bolts. The rear side, $h$, of the hopper D projects for a short distance out through the front pieces of the V-shaped frame, as shown in Figs. 1 and 2.

Between the lower edge of the front side, $i$, of the hopper and the rear side, $h$, a space is left, through which the contents of the hopper may be allowed to escape when desired. Covering this space or opening on the outside is a draw-gate, E, working in guide-strips $j$, fixed on the hopper. This draw-gate is raised or lowered by the lever $k$, which is pivoted, as shown, to the hopper. On and near the handle end of this lever is attached a spring, $l$, which has fixed to it a holding-pin, $m$. This pin plays through a hole in the lever and into any one of the holes $n$ in the hopper-front $i$ and in the lever-guard $o$. By this means the draw-gate may either be held closed or open to any desired height.

The rear side, $h$, is only used when distributing fertilizers. It is held in place by the two pins, $p\ p$, and when the wagon is used for depositing or scattering manure this rear side of the hopper may be removed by simply withdrawing the pins $p\ p$.

To guard against an uneven distribution of the manure as it drops through the hopper, I have placed underneath it a number of fingers, $q$, sustained by a crossing head, G, which is hinged, as shown, to the hopper. The points or forward ends of these fingers may be raised or depressed by raising or lowering the handle $r$, which is fixed securely to the rear side of the cross-head G. This handle may be held at any desired height by the device shown fixed on the rear side of the hind axle, and consisting of the spring $s$, which is screwed or bolted to the axle, and has fixed in it a pin, $t$, which penetrates through the keeper $u$ and the strap $v$, and extends for a suitable distance into the axle itself. The strap $v$ is hinged to the handle $r$, and is provided with a number of pin-holes, through any one of which the pin $t$ may be placed, and whereby the pitch of the fingers $q$ may be raised, as desired. The yielding of the spring $s$ will allow the pin $t$ to be withdrawn, so that the strap $v$ may be raised or lowered; but in its natural state will hold the pin in the hole to its full extent.

Underneath the hopper D is placed a distributing-roller, F. It is journaled in the corner-pieces of the V-shaped frame, and is provided with radiating beaters or arms $v'$, placed in rows along its sides, as shown in the drawings. One-half the number of beaters are made knife-shaped, or with cutting-edges. The remaining half are simply rods, of any convenient section. These beaters have two duties to perform, which will be hereinafter explained. The rear side, $h$, of the hopper D is supported on and fixed securely to a sliding frame, $b'$, into the sides of which the pins $p$ $p$ project, in order to hold it in its place in the hopper. Underneath and extending across the rear side, $h$, is placed the agitator-bar H, which slides loosely upon the supporting-strips $b^2$, which are screwed or otherwise fixed to the inner pieces of the sides of the sliding frame $b'$. To this agitator-bar are attached the two spiral springs $c'$, the other ends of these springs being secured to one of the cross-bars $d'$ of the sliding frame $b'$. A number of short studs, $e'$, are riveted or otherwise fixed into the agitator-bar H, projecting upward through an equal number of slots, $f'$, in the rear side, $h$, of the hopper D, so that when the hopper is loaded with fertilizers the studs $e'$ will extend a short distance up into the mass, and when kept in motion by the mechanism hereinafter described will prevent the clogging up of the material in the hopper and insure its steady and regular delivery from the hopper. In the rotation of the distributing-roller F the beaters strike against the agitator-bar H, as shown in Fig. 5, pressing it forward, the slots $f'$ allowing the necessary forward and backward play of the studs $e'$. As soon as the beaters have cleared the agitator-bar the recoil of the springs $c'$ draw it quickly back until the studs $e'$ come against the rear or upper ends of the slots $f'$.

When the wagon is used for distributing manure the rear side, $h$, of the hopper is removed, as before explained. The main back I then forms the rear side of the hopper, and the fingers $q$ the bottom upon which the manure mainly rest. The beaters $v'$, at each revolution of the roller F, come up between the fingers $q$ and throw off a portion of the manure, which is thereby evenly distributed on the ground. If the fingers $q$ are raised up to near the ends of the beaters $v'$, the manure will be thrown off in small quantities; but if the fingers are lowered the manure will be more quickly deposited on the ground. By this arrangement the coating of manure can be laid on the ground at any desired thickness.

On one or both ends of the distributing-roller is keyed or otherwise fixed a chain-pulley, J, which is driven by the chain $g'$ passing over it and over the large chain-wheel K. This chain-wheel K is placed on the rear axle, revolving freely upon it and inside of one of the wagon-wheels. It has for its hub or center the controlling part of an ordinary clutch-coupling, the toothed face of which is next to the wagon-wheel, so that it may be thrown into gear with its corresponding touch-plate, which is securely fixed to the inner end of the wagon-wheel hub. The sleeve or shank $h'$ of the controlling part of the coupling passes through the chain-wheel K and beyond it for a short distance, and has formed in it the neck $i'$, in which the fork $j'$ of the starting-lever L is fitted. The journal $k'$ of the rear axle, M, is made sufficiently long to allow the controlling part of the coupling to be drawn well out of gear with its mate on the wagon-wheel. The starting-lever L, by which the coupling, and with it the chain-wheel K, is thrown into and out of gear, is pivoted to the rear portion of the hopper. A spring, $l'$, holds the other end of this lever so as to keep the clutch out of gear, in which case the chain-wheel K will not revolve with the wagon-wheel. The chain-wheel and distributing-roller F may be started at will by the driver from his seat by simply throwing the starting-handle N, Fig. 1, backward. This, through the connecting-rod $m'$, throws back the arm $n'$ and turns the eccentric $o'$, which presses against the starting-lever L, overcoming the inclination of the spring $l'$ to hold the clutch out of gear, and throws the clutch into gear, thereby starting the distributing mechanism, which may be again stopped by reversing the handle N.

The hay-rack shown in Fig. 6 is made in two parts, which are connected together by common loose-joint hinges $p'$, which may be easily drawn apart when required. Having removed the dumping-boxes B and C, the hay-rack is hinged together and laid transversely on the body-frame A, the notches $q'$ resting on the sides of the frame, and the inner ends of the cross-pieces O, supported by the bottom, placed inside the body-frame A. $r'$ $r'$ are spring-hasps, attached, as shown, to the rack, and made so as to reach into the sockets $e$ and hold the rack securely to the body-frame. The hasps, being bowed out, throw the enlargement on their outside out under the socket $e$ and prevent its being drawn out until the hasps are pressed into the sides of the body-frame.

The distributing mechanism may be driven from one or both of the rear wheels through a system of gearing, or the chain $g'$ may be substituted by a rope or belt; but I claim that these would be merely modifications of my invention.

Having thus described my improved convertible wagon, what I claim as my invention is—

1. In a convertible wagon, the combination of the wheeled frame, the box or body consisting of the two sections B C, mounted on horizontal pivots, and the side plates, substantially as described, to close the space between the inner ends of the body-sections.

2. The wheeled main frame and the two tilting body-sections thereon, in combination with the hopper D, provided with the adjustable gate and discharging mechanism, substantially as shown.

3. In combination with the hopper, the reciprocating agitator H, provided with studs, and the rotary distributer having its arms arranged to operate in connection with the agitator, substantially as described.

4. The convertible wagon for agricultural purposes, consisting of the wheeled frame, the body-sections hinged thereto, the hopper D, fixed thereunder, and the removable bottom $h$, with the feeding appliances connected therewith, as described and shown.

5. In combination with the hopper and the rotary feeder F, the rock-shaft G, provided with the fingers $q$ and the adjusting-lever $r$, as shown, whereby the relation of the fingers $q$ to the arms of the feeder may be changed as required.

JOHN O'NEIL.

Witnesses:
J. L. RICHARD,
L. E. NOËL.